INVENTOR.
Brooks Walker

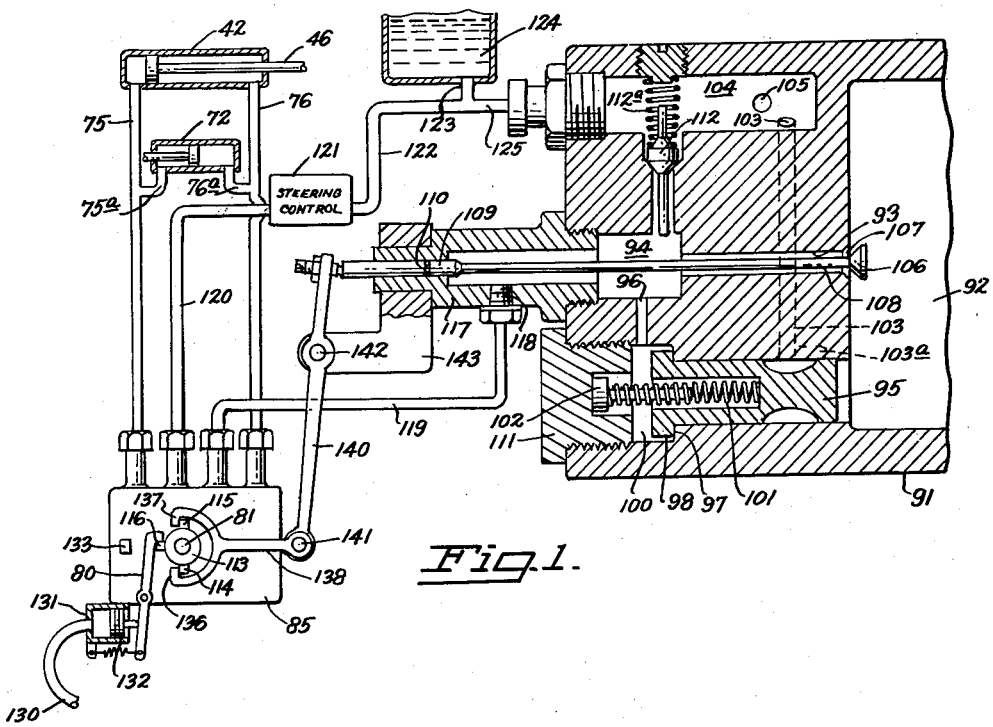

United States Patent Office 3,011,314
Patented Dec. 5, 1961

3,011,314
FLUID POWER TRANSMISSION
Brooks Walker, 155 Montgomery St., San Francisco, Calif.
Original application Dec. 2, 1957, Ser. No. 700,216. Divided and this application Dec. 28, 1959, Ser. No. 3,706
15 Claims. (Cl. 60—52)

This invention pertains to a fluid power transmission device especially useful in a vehicle lifting and traversing or vehicle turning device. This application is a division of application Serial No. 700,216, filed December 2, 1957, which was a continuation-in-part of application Serial No. 384,633, filed October 7, 1953, now abandoned.

The device disclosed in application Serial No. 700,216, like some of my earlier inventions in this general field, show how the rear of a vehicle can be raised by hydraulic power obtained from an engine driven pump, such as the pump normally used for power steering, and how, when raised, the car can be moved to the right or left by the same low and reverse gears used in normal operation of the car, its movement being stopped by the same hand or foot brake normally used to stop the car.

A feature of the present invention, in connection with use of the pump normally used for power steering to raise the car on the spare wheel, is the provision of means to increase the discharge of the pump at the same engine speed, by providing a shift in the flow control valve to give greater flow at the same engine speed when raising or lowering the car on the mechanism than when operating the normal power steering.

Another feature of the invention is to provide a lock out so that the mechanism cannot be lowered except when the foot brake is fully applied.

Other features of the invention will be more particularly pointed out in the accompanying specification and claims.

I have illustrated my invention in the accompanying drawings, in which:

FIG. 1 is a partly diagrammatic view in elevation and in section of a hydraulic circuit that embodies the principles of the invention.

FIG. 2 is a view partly in section, and partly diagrammatic of a modified form of part of the hydraulic circuit shown in FIG. 1.

Figure 3:
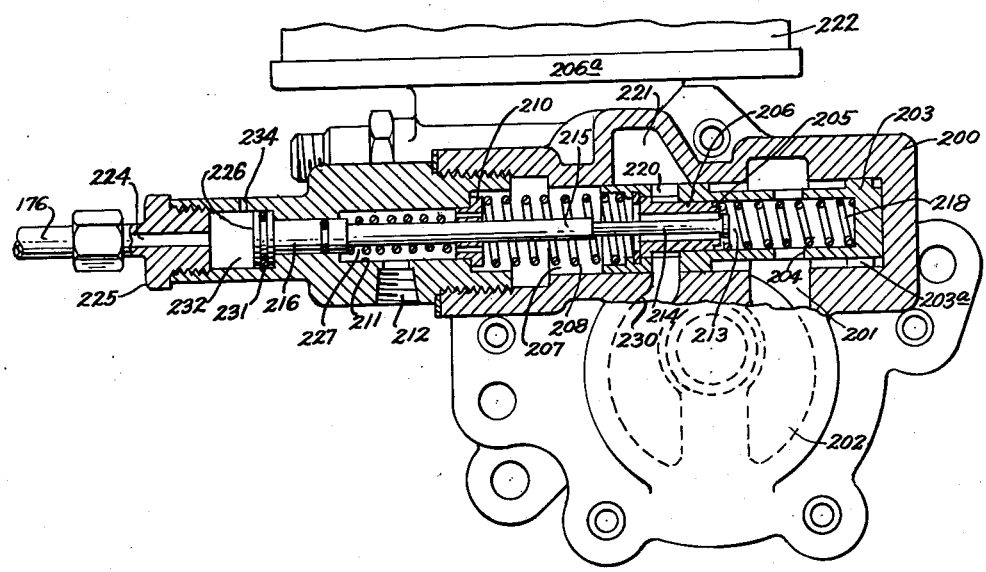
FIG. 3 is a view in side elevation, partly in section and partly diagrammatic, showing a portion of an alternate type of hydraulic control.

In FIGS. 1 and 2 I show a hydraulic circuit that can be used with the invention. A fluid pump 91 is driven by the engine (not shown) in the same manner as the power steering pumps now used in high production motor cars, or as shown in the service manual for 1952 Cadillacs. The outlet chamber from the pump is shown at 92. The balance of the pump 91 and its drive are not shown, as it is a conventional pump like that used for power steering on many cars, such as that described in the service manual for 1952 Cadillacs.

An orifice passage 93 connects the high pressure chamber 92 with a chamber 94. The drop in unit pressure of the liquid in passing from the chamber 92 to the chamber 94 acts on a constant flow valve 95, because the chamber 94 is connected to the rear of the valve 95 by a port 96. The enlarged flange 97 on the valve 95 limits its motion to the right, as viewed in FIG. 1, while a flat portion 98 allows the pressure in a chamber 100 to act on both sides of flange 97 and therefore on the same area of the valve 95 that the pressure from the chamber 92 acts on at the other end of the valve 95. A spring 101 retained by a plug 111 rides on a guide 102 and urges the flow valve 95 to the right, as viewed in FIG. 1 against the flange 97. When the unit pressure drop between the chamber 92 and chamber 94 overcomes the action of the spring 101, the valve 95 moves to the left and uncovers a port 103, which leads to an inlet chamber 104 and thence to the pump intake via a port 105. The higher pressure on the right side of valve 95 moves valve 95 toward the lower pressure or toward the left (as viewed in FIG. 1) against the action of spring 101. The lower pressure in area or chamber 94 and area or chamber 100 at the left of valve 95 causes this motion of valve 95 to the left to uncover the slot 103a to the right of the bottom of opening 103 which then connects chamber 92 and the area to the right of valve 95 to port 103a, hole 103, to chamber 104 which is connected to the intake to the pump and therefore causes valve 95 to act as a flow control valve to maintain the discharge of the pump constant as long as the area of port 93 remains unchanged. When port 93 is enlarged by moving valve 106 to the right (as viewed in FIG. 1) more oil must be pumped through the larger orifice to create the pressure drop between chamber 92 and chamber 100 to cause flow control valve 95 to limit the constant flow to a higher value with a larger opening at area 93 than with a small area at area 93.

The valve 106 covers and uncovers a seat 107 leading to the passage 93 and is mounted on valve stem 108. The stem 108 has a valve stem guide member 109 and a fluid seal 110. A safety valve 112 and its associated spring 112a limit the maximum unit pressure in the chamber 94 and its connected passageways.

The control shaft 81 for the four-way open-center valve 85 has a collar 113 which carries three ears 114, 115, and 116 respectively. When the shaft 81 is in the neutral position, as shown in FIG. 1, oil flows from the pump to the chamber 92, the passage 93, the chamber 94, and inside an extension 117 to a fitting 118. From the fitting 118 it flows via a pipe 119 to the open center of the valve 85, whence it flows out a pipe 120, through a steering control consisting of a power steering valve and unit 121, into a line 122. It flows thence via one branch line 123 to a reservoir 124, and via another branch line 125 to the intake chamber 104 of the pump housing, whence it flows through the port 105 to the intake of the pump.

To prevent accidental lowering of the vehicle raising and traversing device while the vehicle is in motion down the road, I use a hydraulic foot-brake lock out, such as is illustrated in FIG. 1. Fluid from the foot brake master cylinder goes through a pipe 130 to a cylinder 131 to actuate a piston 132 which abuts against the spring-loaded lock arm 80, the upper end of which engages the ear 116 to prevent clockwise rotation of the valve shaft 81 into the tire-lowering position, until the foot brake is set. When the foot brake is firmly set, it unlocks the arm 80, pushing its upper end against a stop 133, so that the valve shaft 81 can rotate clockwise, after which pressure flows from the line 119 to the lines 75 and 75a to actuate the cylinders 42 and 72, which, respectively, lift the car on the spare wheel and engage the gears that drive the spare wheel, as explained in application Serial No. 700,216.

The return lines 76 and 76a from the cylinders 42 and 72 returns the fluid to the open center valve 85 where it is valved to flow out through the line 120 through the power steering valve and cylinder 121 and line 122 to reservoir 124 and chamber 104 as described above. When the valve shaft 81 is rotated counterclockwise from the position shown, oil flows from the line 119 through the lines 76 and 76a to the opposite ends of the cylinders 42 and 72 from those connected to the lines 75 and 75a. Oil also flows back through the lines 75 and 75a, the valve 85, out the line 120, through the power steering valve and cylinder unit 121, to the reservoir 124 and chamber 104. When the valve shaft 81 is rotated clockwise from the position shown, oil flows through the line 119 to the lines 75 and 75a into the cylinders 42 and 72, and then oil flows back through the lines 76 and 76a, the valve 85, through the line 120, and the power steering valve and cylinder unit 121 to the reservoir 124 and chamber 104.

At the same time that the valve shaft 81 is rotated either way, ears 114 and 115 engage ears 136 and 137 of an arm 138 to move the arm 138 to the left, as viewed in FIG. 1, rotating an arm 140 clockwise through a pivotal connecting pin 141. The arm 141 is pivoted at a pin 142 on an extension member 143 and acts to move the valve 106 to open a larger orifice during the time the cylinder 42 is being actuated in either direction. When the valve 106 opens the orifice, it provides a larger constant-quantity discharge, as more volume of fluid must flow past the enlarged orifice to get enough drop to operate the constant-flow valve 95. Thus, for example, for normal power steering, the flow valve controls the pump discharge through the line 119 to approximately 1.7 gallons per minute while such discharge is raised to 2.5 to 4 gallons per minute when the valve shaft 81 is rotated either right or left from the position shown. This provides faster car lift and faster fifth-wheel retraction than if limited to normal power steering pump discharges.

In FIG. 2 I have shown another hydraulic circuit that can be used with the invention. In this construction, a power-steering unit 150 is supplied with pressure from the pump 91, and a circuit is provided for operating the parking device in a somewhat different manner. The cylinder 151 is used to lower the spare tire like the cylinder 42, except that it is shown as a single-acting cylinder with a spring 174 return. Likewise, the cylinder 72a is a one-way cylinder to engage the gears for driving the spare wheel, when the vehicle is raised on the spare tire. These gears are disengaged by a spring 152 when there is no lifting pressure in the upper end 153 of the cylinder 151. When there is pressure in the upper end 153 of the cylinder 151, it is transmitted to a cylinder 154 to act on a piston 155 to move a valve rod 156 to the right and to cause a valve 157 to open the passage to the port 93, so that the constant flow valve 95 will control flow at a higher volume during the vehicle lifting operation.

In FIG. 2 I have shown a different valve 160 for controlling the one-way cylinders 151 and 72a. A plunger 161 leaves the pump output line 119 connected to the return line 120 when in the position shown. The car is held in the raised position when the valve is in this position by blocking off a line 162. When the plunger 161 is moved to the right by a clockwise movement of control handle 163 from the position shown, through control cable 164 and spring 165, a valve element 166 covers a port 167, and the line 119 is connected to the line 162 to cause the cylinder 151 to lift the car on the spare tire. At the same time, an element 170 blocks off a port 171 leading to the line 120.

The handle 163 is pivoted at 172 and held in position by a quadrant 173. When the valve 161 is moved to the left by the handle 163 and the cable 164, the car is held raised, as stated before, in the position shown. When moved further to the left, a spring 174 and the weight of the car retract the piston in the cylinder 151 to retract the spare tire, connecting the line 162 with the port 167 and the line 113a, the line 113a being connected to the line 120 by a line 175 between the power steering unit 150 and the return cavity 104 of the fluid pump.

The spring 152 acts in a similar manner in this far left position of the valve plunger 161 to cause disengagement of the gears that drive the spare wheel. At the same time, the output line 119 from the pump is connected to the power steering unit 150 by the line 120, so that power steering is effective during the retraction of the spare tire, and the car can be driven with the aid of power steering while the spare wheel is being retracted by the spring 174.

When the car is being raised on the spare wheel, the pump is delivering a higher volume than normal through the operation of the valve 157, which is opened against the spring 174 by back pressure caused by the piston in lifting fluid pressure action of the piston in cylinder 151 going through a line 176 to act on the piston 155 in the cylinder 154. Power steering unit 150 is then by-passed, as power steering is not needed during the car raising operation. Also, there are sometimes restrictions in the power steering valves, etc. that might restrict the speed of lift at high pump volume if the discharge from the back of the cylinders had to go through power steering unit 150, as it goes through the unit 121 in FIG. 1, during the car raising operation. The construction shown in FIG. 2 may be used with the valving and cylinders of FIG. 1, by connecting the cylinder 154 to the car raising line 75 of FIG. 1 so that the pressure to lift the vehicle would cause increased flow from the pump whether single acting cylinders, as shown in FIG. 2, or double acting cylinders, as shown in FIG. 1, are being used.

Figure 4:
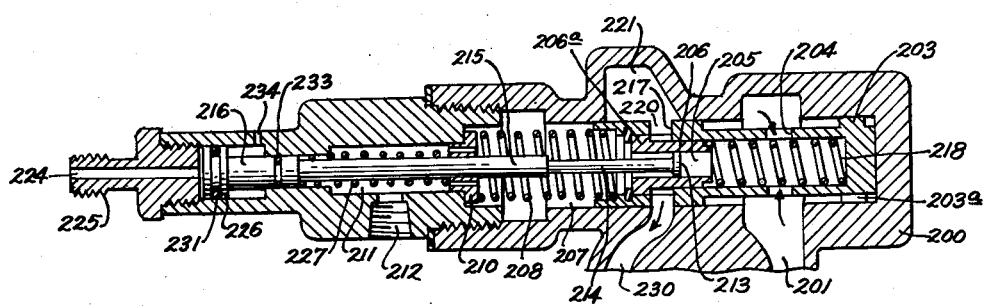
FIG. 4 is a view similar to the upper portion of FIG. 3 but with the control valves shown in another position.

In FIGS. 3 and 4 I have shown a different type of valve control to get higher volume discharge from the power steering pump during the raising and lowering or hydraulically actuated strokes of the cylinders 151 or 42. FIGS. 3 and 4 show part of a pump 200 which is generally of the type used by many American car manufacturers using power steering since 1952 and as shown and described in the power steering service manual for 1953 Packard motor cars. The pump 200 has a discharge passage or chamber 201 coming from the pump rotor 202. A constant flow valve 203 receives oil under pressure from the chamber 201, which acts on the right-hand end of the valve 203 at a passage 203a. The passage 203a admits oil to the right-hand end of FIG. 3. Ports 204 admit oil to the center chamber of the valve 203, which contains a spring 218. From there the oil passes through the open center passage 205 of a pressure relief valve 206 into a passage 207 containing a spring 208, through a perforated retainer 210 into a passage 211 and out a port 212 to the line 119 of FIGS. 1 and 2. The size of this passage through the center of the valve 206 is restricted by a valve 213 mounted on a valve stem 214 which is connected by a stem 215 to a stem 216. The larger diameter of an end 206a of the valve 206 allows the pressure relief valve 206 to move against a spring 218 to uncover part or all of a port 220 to discharge part of the fluid into a cavity 221, which is the intake to the pump and is also connected to a reservoir 222 in the conventional manner.

All the construction described so far is substantially conventional, except for the valve 213, as the conventional pump has a control valve operating on the drop in pressure across a fixed area orifice. In this case, the valve 213 causes the orifice in the center of relief valve 206 to be greatly enlarged when fluid pressure from the line 176 enters a passage 224 in a fitting 225 from the line 176 to actuate a piston 226 against a spring 227. The spring 227 abuts against the perforated retainer 210 to force the shaft 214 to the position shown in FIG. 4 upon a lowering of fluid pressure in line 176.

In the position of the valve 213 shown in FIG. 3, the orifice through the valve 206 is large, and a large constant volume discharge will result for rapid raising of the vehicle. With the valve 213 in the position shown in FIG. 4, the discharge of the pump is constant at a lower volume sufficient for power steering. Also, with this construction, when the pressure relief valve moves to the right to discharge fluid into a port 230, it will move over the valve 213 and a smaller discharge through the port 212 will result.

The piston 226 has a seal 231 to prevent fluid from a chamber 232 from passing the piston 226, and the piston rod 216 has a seal 233. The area back of the piston 226 is ported by a port 234. The spring 208 urges the constant flow valve 203 to the right against the action of the drop in pressure between the chamber 201, which acts on the right end of the valve 203 through a passage 203a and the reduced pressure after passing the valve 213, which reduced pressure acts on the left end of the valve 203.

From the foregoing it can be seen that I have provided a control that gives a greater discharge from a pump when the vehicle is to be raised or lowered than when the pump is running normally, as when supplying power steering. However, this circuit may be used without power steering and would result in power saving, as only a small amount of fluid would be circulated except when the fluid is needed to operate the vehicle lifting or other similar device. The actuation of the valve 213 of FIGS. 3 and 4 could be by an arm, such as the arm 140 of FIG. 1, rather than by the piston 226 as shown.

I do not wish in any way to limit myself to the exact details or mode of operation set forth in the specifications and drawings without departing from the spirit and scope of my invention which is set forth in the following claims.

I claim:

1. In a fluid power system having a pump with discharge means, flow-control means connected to said discharge means and having orifice means for providing a substantially constant flow rate of fluid from said discharge means over a wide range of pump output, according to the pressure drop across said orifice means, and a first fluid-operated device connected to said flow-control means, the combination therewith of: a second fluid-operated device normally deactuated and disconnected from said flow-control means; means for connecting said second device to said flow-control means and for simultaneously acting on said orifice means to provide a substantially higher flow rate during the time said second device is so connected.

2. The system of claim 1 wherein said first fluid-actuated device remains connected to said flow-control means when said second device is connected.

3. The system of claim 1 wherein said means for connecting said second device connects it in series with said first device.

4. The system of claim 1 wherein said means for connecting said second device disconnects said first device from said flow-control means so long as said second device is connected to said flow control means.

5. In a fluid power system having a pump with discharge means, the combination of: a flow-control valve connected to said discharge means and having an orifice; means for varying the size of said orifice between first and second conditions so as to provide in each condition a substantially constant flow rate of fluid from said discharge means over a wide range of pump output, said flow control valve being affected by the pressure drop across said orifice, said second condition providing a larger orifice opening and higher flow rate than said first condition and said first condition being the normal condition; a first fluid-operated device normally connected to said flow-control valve through said orifice; a second fluid-operated device normally deactuated and disconnected from said flow-control valve; and means for simultaneously connecting said second device to said flow-control valve through said orifice-varying means to change said orifice to said larger size during the time said second device is so connected.

6. In a fluid power system having a pump with discharge means, flow-control means connected to said discharge means and having orifice means for providing a substantially constant flow rate of fluid from said discharge means over a wide range of pump output, said flow-control valve being actuated by the pressure drop across said orifice means, and a first fluid-operated device connected to said flow-control means, the combination therewith of: a second fluid-operated device having first and second positions and connectable to said flow-control means; a control device having forward, reverse, and neutral positions; means actuated when said control device is in neutral position for disconnecting said second device from said flow control means; means actuated when said control device is in forward position for connecting said second device to said flow-control means for causing said second device to move to said second position; means actuated when said control device is in reverse position for connecting said second device to said flow-control means in a way causing said second device to move to said first position; and means actuated when said control device is in its forward or is in its reverse position for simultaneously acting on said orifice means to provide a substantially higher flow rate than when said control means is in neutral position.

7. The system of claim 6 wherein said control device, when in forward and reverse positions, connects said first and second devices to said flow control means in series relationship.

8. In a fluid power system having a pump with discharge means, flow-control means connected to said discharge means and having orifice means for providing a substantially constant flow rate of fluid from said discharge means over a wide range of pump output, according to the pressure drop across said orifice means, and a first fluid-operated device connected to said flow-control means, the combination therewith of: a second fluid-operated device having first and second positions and connectable to said flow-control means; a control device having forward, reverse, and neutral positions; means actuated when said control device is in neutral position for disconnecting said second device from said flow control means; means actuated when said control device is in forward position for connecting said second device to said flow-control means for causing said second device to move to said second position; means actuated when said control device is in reverse position for causing said second device to move back to said first position; and means actuated when said control device is in its forward position for simultaneously acting on said orifice means to provide a substantially higher rate of flow than when said control means is in reverse position, the flow rate when said control means is in neutral position being at said substantially higher rate when and only when said second device is then in said second position.

9. The system of claim 8 wherein said control device when in forward position disconnects said first device from said flow control means.

10. In a fluid power system having fluid supply means, a pump having inlet means connected to said fluid supply means and having discharge means, flow-control means connected to said discharge means for providing a substantially constant flow rate of fluid from said discharge means over a wide range of pump output, said flow rate being lower than the normal output of said pump, said flow-control means having an orifice for determining said flow rate, said flow control means being actuated by the pressure drop across said orifice and consequently according to the size of said orifice, means for returning excess fluid from said discharge means to said fluid supply means, and a first fluid-operated device connected to said flow-control means and return-connected to said fluid supply means, said first device being designed for operation at a first orifice size, the combination therewith of: a second fluid-operated device having a return connection to said fluid supply means and normally deactuated and disconnected from said flow-control means;

means for connecting said second device to said flow-control means and for simultaneously enlarging the size of said orifice to provide a second substantially constant flow rate larger than said first flow rate, at the same pump output, so long as said second device is so connected, said orifice size being automatically reduced to provide said first flow rate when said second device is disconnected.

11. In a fluid power system having fluid supply means, a pump having inlet means connected to said fluid supply means and having discharge means, flow-control means connected to said discharge means for providing a substantially constant flow rate of fluid from said discharge means over a wide range of pump output, said flow rate being lower than the normal output of said pump, said flow-control means having an orifice for determining said flow rate according to the pressure drop across said orifice and consequently according to the size of said orifice, means for returning excess fluid from said discharge means to said fluid supply means, and a first fluid-operated device normally connected to said flow-control means and return-connected to said fluid supply means, said first device being designed for operation at a first orifice size, the combination therewith of: a second fluid-operated device having a return connection to said fluid supply means and normally deactuated and disconnected from said flow-control means; means for (1) connecting said second device to said flow-control means, (2) simultaneously disconnecting said first device from said flow-control means, and (3) simultaneously enlarging the size of said orifice to provide a second flow rate larger than said first flow rate, at the same pump output, so long as said second device is so connected, said orifice size being automatically reduced to provide said first flow rate when said second device is disconnected and said first device reconnected.

12. In a fluid power system having fluid supply means, a pump having inlet means connected to said fluid supply means and having discharge means, means for returning excess fluid from said discharge means to said fluid supply means, and a first fluid-operated device return-connected to said fluid supply means, the combination therewith of: flow-control means connected to said discharge means and having an orifice and a valve member for varying the size of opening at said orifice, said valve member in any one position providing a substantially constant flow rate of fluid from said discharge means over a wide range of pump output determined by the pressure drop across said orifice and providing a different flow rate when in a different position, according to the size of said opening at said orifice; means for normally connecting said first device to said flow control means; a second fluid-operated device having a return connection to said fluid supply means; a valve for connecting and disconnecting said second device to said flow-control means; and a lever connected to said valve for moving said valve member to enlarge the size of said opening at said orifice when said valve connects said second device to said flow-control means and to reduce the size of said opening at said orifice when said valve disconnects said second device from said flow-control means.

13. The device of claim 12 having safety lockout means for said valve normally holding said valve and said lever in the position where said second device is disconnected from said flow-control means, and lockout release means for enabling actuation of said valve.

14. In a fluid power system having fluid supply means, a pump having inlet means connected to said fluid supply means and having discharge means, means for returning excess fluid from said discharge means to said fluid supply means, and a first fluid-operated device return-connected to said fluid supply means, the combination therewith of: flow-control means connected to said discharge means and having an orifice and a valve member for varying the size of opening at said orifice, said valve member in any one position providing a substantially constant flow rate of fluid from said discharge means over a wide range of pump output determined by the pressure drop across said orifice and providing a different flow rate when in a different position, according to a different size of said opening at said orifice; means for normally connecting said first device to said flow control means; a second fluid-operated device having a return connection to said fluid supply means; a valve having a first position connecting said first device to and disconnecting said second device from said flow-control means and a second position for disconnecting said first device from and connecting said second device to said flow-control means; manual actuation means for said valve; and fluid-actuated means for enlarging the size of said opening at said orifice when said valve connects said second device to said flow-control means.

15. In a fluid power system having a pump with discharge means, the combination of: a flow-control valve connected to said discharge means and having a floating orifice; closure means floating with said orifice for varying the size of said orifice between first and second conditions so as to provide in each condition a substantially constant flow rate of fluid from said discharge means over a wide range of pump output, according to the pressure drop across said orifice, said second condition providing a larger orifice opening and higher flow rate than said first condition; said closure means maintaining the size of orifice formed by said closure means by floating with said orifice; a first fluid-operated device normally connected to said flow-control valve through said orifice; a second fluid-operated device normally deactuated and disconnected from said flow-control valve; and means for simultaneously connecting said second device to said flow-control means through said orifice and actuating said closure means to provide a substantially higher flow rate during the time said second device is so connected.

References Cited in the file of this patent
UNITED STATES PATENTS

| | | |
|---|---|---|
| 2,102,865 | Vickers | Dec. 21, 1937 |
| 2,181,907 | Moffat et al. | Dec. 5, 1939 |
| 2,538,143 | Brown | Jan. 16, 1951 |
| 2,600,632 | French | June 17, 1952 |
| 2,674,092 | Gardiner | Apr. 6, 1954 |
| 2,737,196 | Eames | Mar. 6, 1956 |
| 2,859,762 | Banker | Nov. 11, 1958 |
| 2,931,365 | Carison et al. | June 21, 1960 |